US009426738B2

(12) United States Patent
Lee et al.

(10) Patent No.: US 9,426,738 B2
(45) Date of Patent: Aug. 23, 2016

(54) SYSTEMS AND METHODS FOR MULTI-CHANNEL CONCURRENCY

(71) Applicant: QUALCOMM Incorporated, San Diego, CA (US)

(72) Inventors: Hoon Ki Lee, Santa Clara, CA (US); Dinesh K. Upadhyay, Santa Clara, CA (US); Kiran Venkatappa, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 13/676,761

(22) Filed: Nov. 14, 2012

(65) Prior Publication Data

US 2014/0133469 A1 May 15, 2014

(51) Int. Cl.
  *H04J 3/00* (2006.01)
  *H04W 52/02* (2009.01)
  *H04W 48/12* (2009.01)
  *H04W 84/12* (2009.01)
  *H04W 88/06* (2009.01)

(52) U.S. Cl.
  CPC .......... *H04W 52/0216* (2013.01); *H04W 48/12* (2013.01); *H04W 84/12* (2013.01); *H04W 88/06* (2013.01)

(58) Field of Classification Search
  CPC .. H04W 56/00; H04W 36/22; H04L 27/2656; H04L 27/2655
  USPC ......................................... 370/329, 338, 336
  See application file for complete search history.

(56) References Cited

U.S. PATENT DOCUMENTS

| 6,006,106 | A | 12/1999 | Cook et al. |
| 6,131,049 | A | 10/2000 | Marsan et al. |
| 7,500,119 | B2 | 3/2009 | Tsai |
| 7,586,948 | B2 | 9/2009 | Hiddink et al. |
| 7,653,031 | B2 | 1/2010 | Godfrey |

(Continued)

FOREIGN PATENT DOCUMENTS

| CN | 101056440 A | 10/2007 |
| CN | 102036340 A | 4/2011 |

(Continued)

OTHER PUBLICATIONS

Das G., et al., (Eds) Intelligent information technology, Proceedings from CIT 2004: 7th International Conference on Information Technology, Thakur, S.S., et al., "Clock Synchronization in IEEE 802.11 Ad Hoc Networks," Dec. 2004, pp. 180-189.

(Continued)

*Primary Examiner* — Yemane Mesfin
*Assistant Examiner* — Abdelillah Elmejjarmi
(74) *Attorney, Agent, or Firm* — Paradice and Li LLP

(57) ABSTRACT

Systems and methods are disclosed to dynamically assign priorities to beacons sent from different networks to allow a device to selectively receive a beacon from one of the networks when a conflict occurs. When two or more beacons from different networks arrive at times that do not allow the client device to receive all of the beacons, one beacon may be selected for reception based upon a priority determination. An initial priority may be assigned to beacons from each network. Further, the initial priorities may be adjusted so that a more desirable rate of receiving the beacons may be achieved.

27 Claims, 3 Drawing Sheets

(56) References Cited

U.S. PATENT DOCUMENTS

| | | |
|---|---|---|
| 8,027,378 B1 | 9/2011 | Yang et al. |
| 8,099,094 B2 | 1/2012 | Marinier et al. |
| 8,165,050 B2 | 4/2012 | Ngo et al. |
| 8,279,896 B2 | 10/2012 | Etkin et al. |
| 8,284,061 B1 | 10/2012 | Dione |
| 8,301,760 B1 | 10/2012 | Zadicario et al. |
| 2004/0146091 A1 | 7/2004 | Chang et al. |
| 2004/0190648 A1 | 9/2004 | Anim-Appiah et al. |
| 2004/0203817 A1 | 10/2004 | Rao et al. |
| 2004/0218568 A1 | 11/2004 | Goodall et al. |
| 2005/0176432 A1 | 8/2005 | Kamura et al. |
| 2006/0009220 A1 | 1/2006 | Kiyomoto et al. |
| 2007/0008922 A1 | 1/2007 | Abhishek et al. |
| 2007/0047499 A1 | 3/2007 | Montojo et al. |
| 2007/0116007 A1 | 5/2007 | Xiao et al. |
| 2007/0140188 A1* | 6/2007 | Melkote ............ H04W 16/02 370/338 |
| 2007/0147321 A1* | 6/2007 | Jung ............ H04W 72/1278 370/338 |
| 2007/0165589 A1 | 7/2007 | Sakoda |
| 2007/0249354 A1 | 10/2007 | Seo et al. |
| 2007/0258419 A1* | 11/2007 | Zhao ............ H04W 74/0875 370/338 |
| 2008/0101324 A1 | 5/2008 | Stark |
| 2008/0170551 A1 | 7/2008 | Zaks |
| 2008/0232373 A1 | 9/2008 | Iyer et al. |
| 2009/0034460 A1 | 2/2009 | Moratt et al. |
| 2009/0067397 A1 | 3/2009 | Seok |
| 2009/0129275 A1 | 5/2009 | Watanabe et al. |
| 2009/0238133 A1* | 9/2009 | Sakoda ............ H04W 72/1242 370/329 |
| 2009/0296864 A1 | 12/2009 | Lindoff et al. |
| 2010/0029325 A1 | 2/2010 | Wang et al. |
| 2010/0177757 A1 | 7/2010 | Kim et al. |
| 2010/0219250 A1 | 9/2010 | Wang |
| 2010/0223524 A1 | 9/2010 | Duggan et al. |
| 2010/0223534 A1 | 9/2010 | Earnshaw et al. |
| 2010/0278065 A1 | 11/2010 | Sun et al. |
| 2011/0002234 A1 | 1/2011 | Chang et al. |
| 2011/0070836 A1 | 3/2011 | Park et al. |
| 2011/0075635 A1 | 3/2011 | Ryu et al. |
| 2011/0083065 A1 | 4/2011 | Singh et al. |
| 2011/0255618 A1 | 10/2011 | Zhu et al. |
| 2011/0305288 A1 | 12/2011 | Liu et al. |
| 2012/0082049 A1 | 4/2012 | Chen et al. |
| 2012/0094681 A1 | 4/2012 | Freda et al. |
| 2012/0129560 A1 | 5/2012 | Lunden et al. |
| 2012/0164948 A1 | 6/2012 | Narasimha et al. |
| 2012/0188998 A1 | 7/2012 | Philips et al. |
| 2012/0314636 A1 | 12/2012 | Liu |
| 2012/0321012 A1 | 12/2012 | Elenes et al. |
| 2013/0094536 A1 | 4/2013 | Hui et al. |
| 2013/0194955 A1 | 8/2013 | Chang et al. |
| 2013/0201838 A1 | 8/2013 | Homchaudhuri et al. |
| 2013/0230035 A1 | 9/2013 | Grandhi et al. |
| 2013/0315141 A1 | 11/2013 | Homchaudhuri et al. |
| 2014/0177501 A1 | 6/2014 | Seok et al. |
| 2014/0241226 A1 | 8/2014 | Jia et al. |
| 2015/0071084 A1 | 3/2015 | Homchaudhuri et al. |

FOREIGN PATENT DOCUMENTS

| | | | |
|---|---|---|---|
| EP | 1424862 A1 | 6/2004 | |
| EP | 1971164 A1 | 9/2008 | |
| EP | 2106192 A2 | 9/2009 | |
| EP | 2372949 A1 | 10/2011 | |
| KR | 20060014900 A | 2/2006 | |
| KR | 100813884 B1 | 3/2008 | |
| WO | 9427377 A1 | 11/1994 | |
| WO | WO2008027907 A2 * | 3/2008 | ............ H04W 52/02 |
| WO | WO-2008027907 A2 | 3/2008 | |
| WO | WO-2008147130 A2 | 12/2008 | |
| WO | WO2009062185 A2 | 5/2009 | |
| WO | WO-2013008989 A1 | 1/2013 | |

OTHER PUBLICATIONS

International Search Report and Written Opinion—PCT/US2013/068759—ISA/EPO—Apr. 8, 2014.

* cited by examiner

SYSTEMS AND METHODS FOR MULTI-CHANNEL CONCURRENCY

FIELD OF THE PRESENT INVENTION

This disclosure generally relates to wireless communication systems and more specifically to systems and methods for facilitating participation in multiple networks.

BACKGROUND OF THE INVENTION

Wireless networks are increasingly employed to provide various communication functions including voice, video, packet data, messaging and the like. One conventional wireless local area network (WLAN) architecture is an infrastructure configuration, typically employing one or more access points that coordinate communications for a number of stations. In other configurations, two or more wireless devices may communicate directly with one another in an ad hoc network, such as in the role of a peer to peer client in a WiFi Direct™ (WiFi Direct) network managed by a group owner. Due to the wide availability, popularity and convenience of WLAN-based wireless communications, it may be desirable for a single device to simultaneously participate in multiple networks. For example, a client device may operate as a station in one or more infrastructure networks or may operate as a peer client in one or more WiFi Direct networks.

For both infrastructure and ad hoc WLANs, various management functions are typically necessary to coordinate operation among the participants, including time synchronization, implementation of power management strategies, advertisement of availability and the like. In particular, conventional operation of a WLAN commonly involves the periodic transmission of a beacon message by a device acting in a management role such as the access point or the group owner. In other types of ad hoc networks, the management functions may be shared among the participating devices. Accordingly, a client device participating in multiple networks may receive periodic beacons sent by the device acting in a management role for each network.

However, the networks typically will be independent of each other so that the beacons sent by the respective manager devices may be transmitted at arbitrary times with regard to each other. Generally, the client device may not be able to receive more than one transmission at a time, and therefore may not reliably receive beacons from all the networks as a result. For example, the management devices for two or more networks may send beacons at times that are sufficiently close to preclude the client device from receiving more than one of the beacons. When more than one of the networks have similar beacon intervals, this potential conflict may reoccur with each beacon transmission. Even if different networks employ different beacon intervals, collisions may still occur intermittently when the beacon transmission times align sufficiently.

A subset of the beacons may include delivery traffic indication map (DTIM) information that may be used to signal that multicast or broadcast traffic has been buffered and will be transmitted following the DTIM beacon. Accordingly, a client device upon receiving a DTIM beacon may remain in active mode in order to receive the buffered data. Receipt of the DTIM beacon may be relatively important for performance of the WLAN as the buffered data will be transmitted following the DTIM beacon, so if the client device is not in active mode, it will not receive the frames.

Without a strategy for selecting which beacon to receive, the beacon from one network may be chosen more frequently relative to others for an arbitrary reason, such as by being sent marginally earlier. Further, networks employing a longer interval may experience a relative degradation in performance as a greater proportion of beacons from networks using a shorter interval may be received.

Therefore, there is a need for a client device participating in multiple WLANs to selectively receive beacons from the networks to achieve a more desired reception rate. Further, there is a need to preferentially receive DTIM beacons. This invention satisfies these and other needs.

SUMMARY OF THE INVENTION

This specification discloses methods for wireless communication including the steps of communicably coupling a client device to a first network and a second network, wherein the first network is associated with a first priority, and the second network is associated with a second priority lower than the first priority, and selectively receiving by the client device a beacon from the first network as a result of the first priority being higher than the second priority. The methods may also include determining by the client device not to receive a beacon from the second network, wherein the beacon from the second network exists within a specified amount of time from time of existence of the beacon from the first network. In addition, the methods may include determining the beacon from the first network and the beacon from the second network may conflict before selectively receiving the beacon. For example, determining the beacon from the first network and the beacon from the second network may conflict may include determining a duration between a target beacon transmission time for the first network and a target beacon transmission time for the second network is below a threshold.

In one aspect, selectively receiving the beacon from the first network may include switching wireless channels by the client device.

In another aspect, the methods may include assigning the first priority to the first network and assigning the second priority to the second network, wherein the first priority and the second priority are based upon beacon intervals for the first network and beacon intervals for the second network. Further, the first priority and the second priority may be based at least in part upon DTIM periods for the first network and DTIM periods for the second network.

In an additional aspect, the methods may include adjusting the first priority relative to the second priority in response to receiving the beacon from the first network. Adjusting the first priority relative to the second priority may include reducing the priority of the first network or increasing the priority of the second network. In such embodiments, the methods may include a beacon from the second network may be selectively received, wherein the second priority is higher than the first priority after adjusting the first priority relative to the second priority.

This disclosure is also directed to systems including a client device for wirelessly communicating with at least a first network and a second network, wherein the first network and the second network periodically transmit beacons, such that the client device may have a priority module configured to assign a first priority to the first network and assign a second priority to the second network, wherein the first priority is higher than the second priority and a wireless local area network (WLAN) module coupled to the priority module and configured to selectively receive a beacon from the first network as a result of the first priority being higher than the second priority. In addition, the WLAN module may also be configured to determine not to receive a beacon from the second network, wherein the beacon from the second network exists within a specified amount of time from time of existence of the beacon from the first network. Further, the priority module may also be configured to determine the beacon from the first network may conflict with the beacon from the second network before the WLAN module selectively receives the beacon. For example, the priority module may determine the beacon from the first network may conflict by determining a duration between a target beacon transmission time for the first network and a target beacon transmission time for the second network is below a threshold.

In one aspect, the WLAN module may selectively receive the beacon from the first network by switching wireless channels.

In another aspect, the priority module may be further configured to assign the first priority to the first network and to assign the second priority to the second network, wherein the first priority and the second priority are based upon beacon intervals for the first network and beacon intervals for the second network. Additionally, the first priority and the second priority may be based at least in part upon DTIM periods for the first network and DTIM periods for the second network.

The priority module of the device may also be configured to adjust the first priority relative to the second priority in response to receiving the beacon from the first network. For example, the priority module adjusts the first priority relative to the second priority by reducing the priority of the first network or by increasing the priority of the second network. Additionally, the WLAN module may selectively receive a beacon from the second network, wherein the second priority is higher than the first priority after adjusting the first priority relative to the second priority.

This disclosure is also directed to a non-transitory processor-readable storage medium for a client device for wirelessly communicating with at least a first network and a second network, wherein the first network and the second network periodically transmit beacons, wherein the processor-readable storage medium has instructions including code for assigning a first priority to the first network, code for assigning a second priority to the second network, wherein the second priority is lower than the first priority, and code for causing the client device to selectively receive a beacon from the first network as a result of the first priority being higher than the second priority. The instructions may also include code for causing the client device not to receive a beacon from the second network if the beacon from the second network exists within a specified amount of time from time of existence of the beacon from the first network. Further, the storage medium may include code for determining the beacon from the first network and the beacon from the second network may conflict before selectively receiving the beacon. For example, the code for determining the beacon from the first network and the beacon from the second network may conflict may include code for determining a duration between a target beacon transmission time for the first network and a target beacon transmission time for the second network is below a threshold.

In one aspect, the code for causing the client device to selectively receive the beacon from the first network may include code for causing the client device to switch wireless channels.

In another aspect, the storage medium may also include code for assigning the first priority to the first network and code for assigning the second priority to the second network, wherein the first priority and the second priority are based upon beacon intervals for the first network and beacon intervals for the second network. Additionally, the first priority and the second priority may be based at least in part upon DTIM periods for the first network and DTIM periods for the second network.

In yet another aspect, the storage medium may include code for adjusting the first priority relative to the second priority in response to receiving the beacon from the first network. For example, the code for adjusting the first priority relative to the second priority may include code for reducing the priority of the first network or for increasing the priority of the second network. In such embodiment, the storage medium may also include code for causing the client device to selectively receive a beacon from the second network, wherein the second priority is higher than the first priority after adjusting the first priority relative to the second priority.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
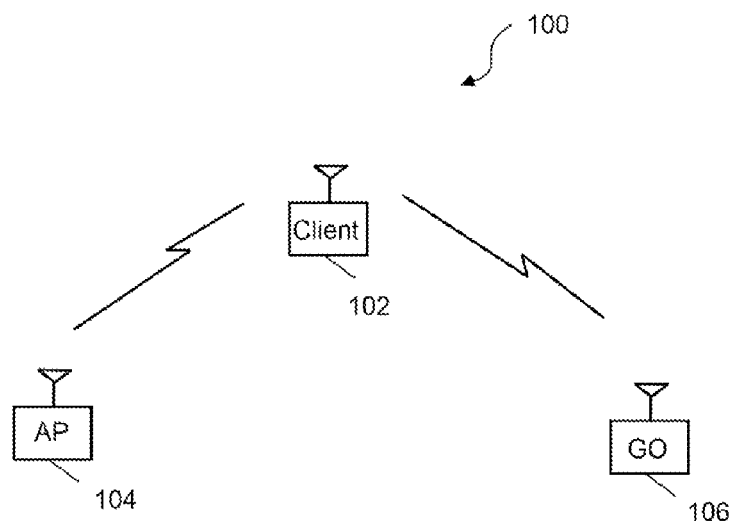
FIG. 1 depicts a wireless communication system, according to one embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Further, embodiments are discussed in specific reference to wireless networks. As such, this disclosure is applicable to any suitable wireless communication systems having the necessary characteristics. Although discussed in specific reference to an infrastructure and ad hoc WLANs, the techniques of this disclosure may be applied to other network configurations or to other wireless communication systems involving periodic beacon transmissions that may be received by a client device.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

As will be discussed in detail below, this disclosure includes techniques for dynamically assigning priorities to beacons sent from different networks to allow a device to selectively receive a beacon from one of the networks when a conflict occurs. When two or more beacons from different networks arrive at times that do not allow the client device to receive all of the beacons, one beacon may be selected for reception based upon the priority determination. An initial priority may be assigned to beacons from each network. In one aspect, the initial priority may be based upon a factor such as beacon frequency. The priority assigned to the beacons of each network subsequently may be adjusted so that a more desirable rate of receiving the beacons may be achieved. In one aspect, priority may be adjusted based upon factors such whether a previous beacon from the network was selected for reception in a conflict resolution. In another aspect, priority also may be adjusted based on the current priority value.

To help illustrate these and other aspects of this disclosure, an exemplary communication system 100 featuring multiple WLANs is schematically depicted in FIG. 1. As shown, client device 102 may participate in more than one WLAN, including a first network managed by access point (AP) 104 and a second network managed by WiFi Direct peer to peer (P2P) group owner (GO) 106. Although the first and second networks may include additional participating devices, they are not illustrated for clarity. Further, in the embodiments shown, client device 102 is configured to participate in an infrastructure network with respect to AP 104 and an ad hoc network with respect to GO 106. However, the techniques may be extended to any number of networks having infrastructure or ad hoc configurations employing suitable wireless communication protocols, such as those established by the Institute of Electrical and Electronics Engineers (IEEE) 802.11 standards.

During operation, AP 104 and GO 106 may send periodic transmissions known as beacons to provide important management information for the respective networks. For example, the beacon may advertise the beacon interval (BI), which establishes the time duration between beacon transmissions so that a participating device may calculate the target beacon transmission time (TBTT) for each network. These beacons may also contain timing synchronization information to help coordinate scheduled activities among the participating devices. Other important network characteristics that may be communicated through the beacons may include the service set identifier (SSID) for the network, capability information, supported rates, whether protection is necessary for non-effective radiated power (non-ERP) stations (e.g., legacy devices implementing 802.11b standards), and other operating parameters.

The beacon message may also be used to implement various power management strategies. For example, the beacon may include information known as a traffic indication map (TIM) or a delivery traffic indication map (DTIM) to allow the management device to signal a client device that data intended for the client device has been buffered and is ready to be transmitted. The beacon may also contain parameters known as the DTIM period and the DTIM count that may be used by a client device to determine whether the current beacon is a DTIM beacon and if not, when the next DTIM beacon is scheduled to be transmitted.

Accordingly, the client device may operate in a power save mode and then transition to an active mode to receive a beacon at the TBTT. If the TIM or DTIM signals that data is pending, the client device may then poll the management device to initiate the transfer of the buffered data. However, if the TIM or DTIM indicates that no data is pending, the client device may immediately return to the power save mode to conserve resources.

Therefore, it is important for client device 102 to regularly receive beacons from each network in which it participates, such as the beacons sent by AP 104 and GO 106. When the TBTTs of the networks are too close, client device 102 may not be able to receive each beacon. By employing techniques of this disclosure, client device 102 may assign and adjust priorities for the networks so that one of the conflicting beacons is selected for reception and a more desirable overall reception rate for beacons from each network may be achieved.

Figure 2:
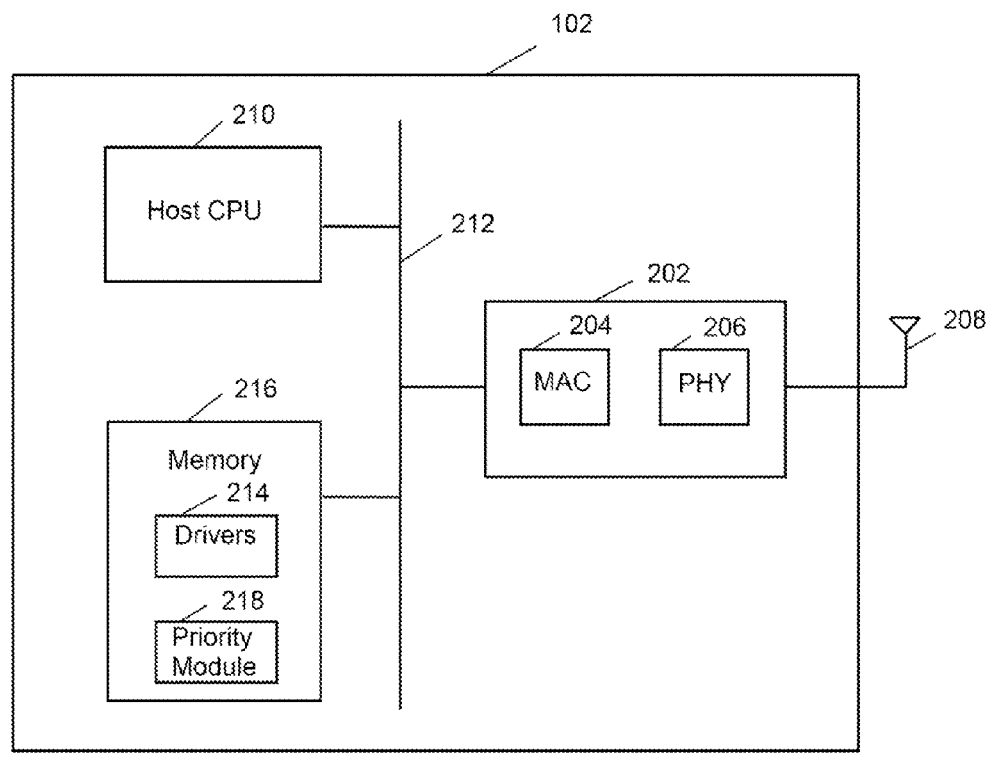
FIG. 2 depicts a client device of the wireless communication system of FIG. 1, according to one embodiment of the invention.

One embodiment of client device 102 is depicted in FIG. 2, showing principle functional blocks in a high level schematic diagram. Generally, client device 102 may employ an architecture in which the lower levels of the WLAN protocol stack is implemented through firmware and hardware in WLAN module 202. WLAN module 202 may therefore include media access controller (MAC) 204 that performs functions related to the handling and processing of frames of data including verification, acknowledgment, routing, formatting and the like. Incoming and outgoing frames are exchanged between MAC 204 and physical layer (PHY) 206, which may include the functions of modulating the frames according to the relevant 802.11 protocol as well as providing the analog processing and RF conversion necessary to provide transmission and reception of wireless signals through antenna 208.

Client device 102 may also include host CPU 210 configured to perform the various computations and operations involved with the functioning of client device 102. Host CPU 210 is coupled to WLAN module 202 through bus 212, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the WLAN system are generally implemented in software as Drivers 214 stored in memory 216 that may be accessed by host CPU 210 over bus 212.

Figure 3:
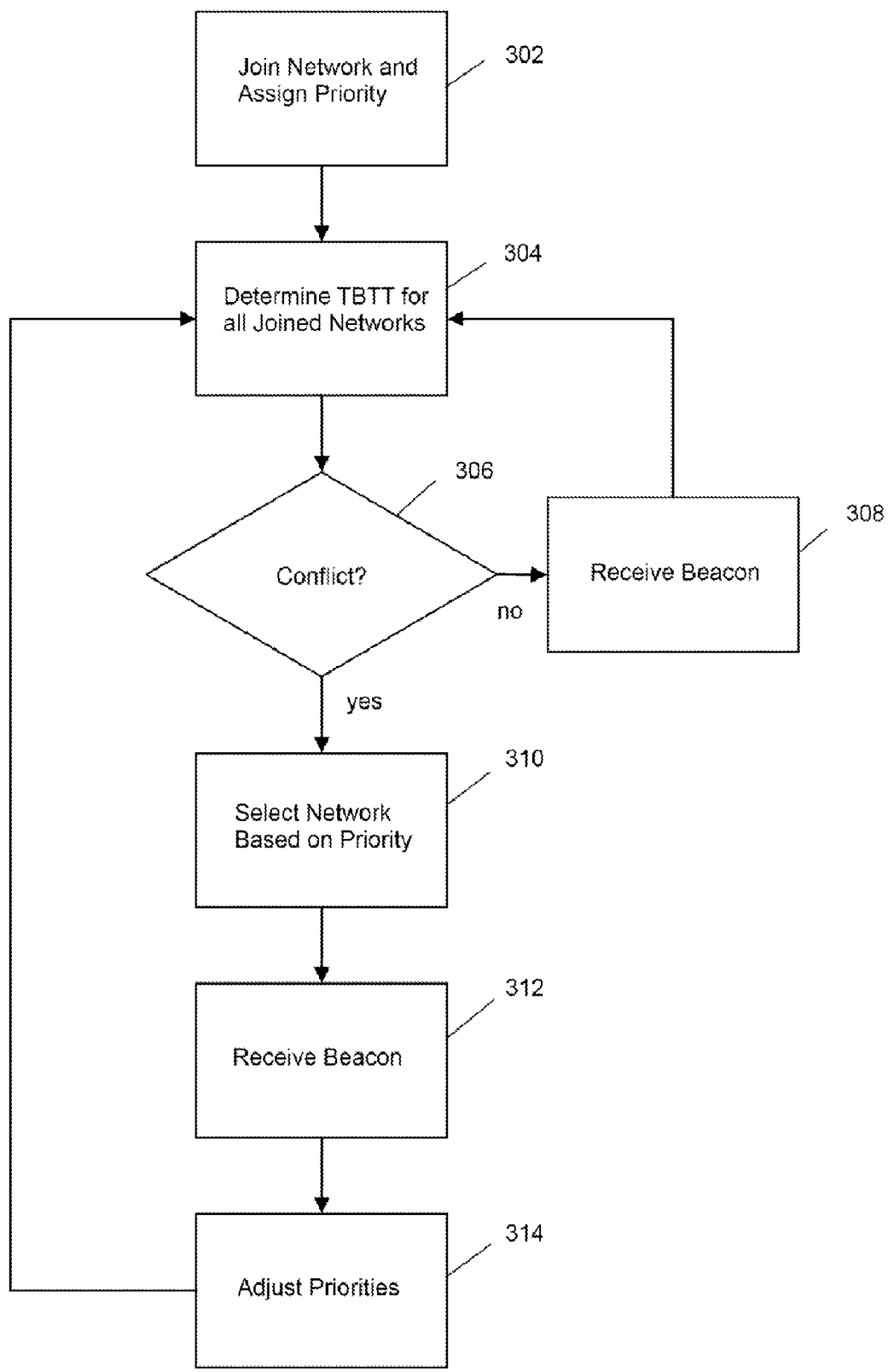
FIG. 3 depicts a flowchart showing a routine for setting and adjusting priority values to select among conflicting beacons, according to one embodiment of the invention.

In one aspect, priority module 218 may be implemented as processor-readable instructions stored in memory 216 that may be executed by host CPU 210 and may be configured to perform assignment of initial priorities to beacons from each network and subsequently adjust the priorities to preferentially receive a beacon from one of the networks when a conflict in TBTT occurs. An exemplary routine is depicted in the flow chart of FIG. 3. In other embodiments, it may be desirable to implement priority module 218 in WLAN module 202, such as at the MAC 204 layer.

Beginning with step 302, client device 102 may be configured to assign an initial priority value to beacons received from a manager device such as AP 104 or GO 106 upon the client device 102 associating with a new network. The initial priority value may be a default value or may be derived from any suitable factor. In one embodiment, the initial priority value may be proportional to the BI established by the network. Accordingly, a network employing longer intervals may be assigned a higher initial priority since relatively fewer beacons will be sent by such a network as compared to a network employing a shorter BI (and therefore having fewer beacons available for reception by the client device 102 as a result). In another aspect, the initial priority value may depend, at least in part, upon the DTIM period. For example, DTIM beacons may be accorded relatively higher priority to increase the chance that client device 102 may receive buffered multicast or broadcast data sent following the DTIM beacon.

Next, in step 304, client device 102 may use information obtained from the beacons of all networks in which client device 102 is participating to calculate the respective TBTTs for a future period (e.g., the upcoming period). In step 306, the calculated TBTTs are compared to determine if a conflict may occur. For example, if two TBTTs are within a given threshold period of time from each other, client device 102 may be unable to receive both beacons, thus creating a conflict. As a practical matter, independent networks within range of each other will often operate on different wireless channels to minimize the potential for interference with each other. Client device 102 therefore may switch channels at PHY 206 in order to receive both beacons. Due to the increased latency associated with switching channels, the threshold period of time used to determine whether a potential conflict exists may be adjusted in situations where the client device 102 will switch channels.

If no conflict is identified in step 306, client device 102 may simply receive a scheduled beacon at the calculated TBTT in step 308. In one embodiment, client device 102 switches channels in order to receive the beacon. The routine may then return to step 304 and client device 102 may calculate TBTTs for another future period (e.g., the next upcoming period). On the other hand, if a potential conflict is identified in step 306, the routine progresses to step 310 to resolve the conflict based upon the respective priority values for the beacons identified as conflicting. As indicated by step 310, client device 102 may select the network having the greatest priority value. In another embodiment, the network may be selected if the priority value is above a specified threshold. In the event that the priority values are equal or multiple networks have a priority value above the specified threshold, client device 102 may be configured to select a network based on a random basis or using a factor or variety of factors, including but not limited to arrival time, order in which the networks were joined, etc. Based upon the resolution of the selection made in step 310, client device 102 may receive the beacon from the selected network as indicated by step 312 (wherein the client device 103 may switch channels to receive the beacon).

Proceeding to step 314, the client device 102 may determine if relative adjustments to the priority values of the networks are to be made and make such relative adjustments. In one embodiment, the client device 102 makes relative adjustments to the priority values of the networks involved in the conflict to maintain desired rates of reception for the affected networks. In one embodiment, the priority values may be adjusted so that the priorities for any non-selected networks are increased relative to the selected network. This relative increase may be implemented by increasing the priority value of a non-selected network, by decreasing the priority value of a selected network, or both. In the example of if a conflict between two networks is identified and the priority value for the selected network is reduced, the priority value may have a limit beyond which it may not be reduced (e.g., zero). Following determining and possible adjustment of the priority values for the affected networks, client device 102 may then return to step 304 to calculate TBTTs for another future period.

Figure 4:
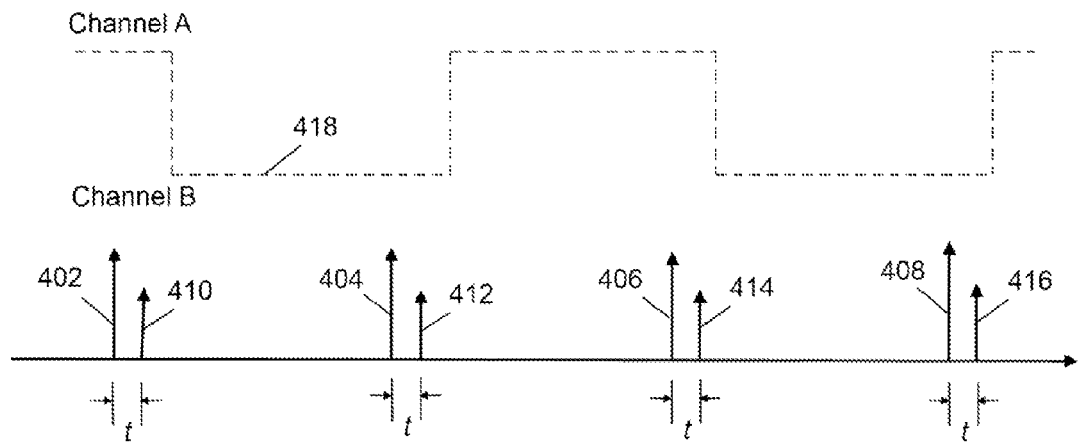
FIG. 4 schematically depicts one example of beacon transmission and reception, according to one embodiment of the invention.

For the purposes of illustration and not limitation, one example of adjustment of the priority values may include resetting the priority values of any non-selected networks to the initial value if the current priority value is zero and not determined to be reduced for a specified sequential number of periods. To help illustrate this example of priority assignment and adjustment, FIG. 4 schematically represents beacons sent by AP 104 and GO 106 and the corresponding operation of client device 102 to select one of the beacons for reception when a conflict exists. As shown, AP 104 periodically transmits a plurality of beacons 402, 404, 406 and 408 while GO 106 similarly transmits beacons 410, 412, 414 and 416. In this example, AP 104 operates on Channel A and GO operates on Channel B.

By comparing the TBTT for beacon 402 and the TBTT for beacon 410, client device 102 may be configured to determine a conflict may occur because the time duration t between the beacons is less than a threshold value. Further, the BIs established by AP 104 and GO 106 in this example are substantially similar or the same, resulting in repeating conflicts that involve each subsequent pair of beacons given that a similar duration t less than the threshold exists between the respective pairs of beacons.

FIG. 4 illustrates that if a static or arbitrary basis was repeatedly employed to resolve these conflicts, the beacons from one of the networks likewise might be repeatedly selected, leading to a degradation in performance of the other network. For example, if the first arriving beacon were selected, the beacons sent by AP 104 would always be selected and the beacons sent by GO 106 would never be received. By employing the priority techniques of this disclosure, such undesirable results may be minimized or avoided.

Accordingly, with respect to FIG. 4, client device 102 may assign initial priority values to the networks managed by AP 104 and GO 106. The initial priority value may be a default value or may be based upon any suitable factor, such as BI. Thus, client device may establish an initial priority value for each network that is proportional to the BI. In this example, AP 104 and GO 106 are configured to employ a BI of 100 time units (TU). For convenience and as an example only, this BI value may be divided by a factor of 10 so that each network is assigned an initial priority value of 10. With respect to beacons 402 and 410, these beacons may be taken to represent the first beacons subject to the priority based conflict resolution. As such, the priority values for beacons 402 and 410 may both have the same initial value, 10. When priority values are equal, client device 102 may be configured to resolve the conflict on a random or arbitrary basis, or in other embodiments in a set order or determination, so that in this example, beacon 402 sent by AP 104 is selected. State line 418 represents the channel on which client device 102 is operating and, as indicated, remains on Channel A so that client device 102 may receive beacon 402 sent by AP 104.

Due to this selection, the respective priority values associated with AP 104 and GO 106 may be adjusted as noted above. In this example, since beacon 402 was selected and beacon 410 was not, the priority value associated with AP 104 may be decreased, the priority value associated with GO 106 may be increased, or both. The adjustment amounts may be based upon the scaling factor used to establish the initial priority value, the desired rate of reception for beacons transmitted by a given network, performance considerations or other conditions. As a non-limiting example, the amount of decrease may be established to provide a balanced reception of beacons from AP 104 and GO 106 by selecting an adjustment amount that corresponds to the greatest common denominator of the initial priority values. If desired, other adjustment values may also be employed. Accordingly, the priority value for AP 104 may be decreased by 10 to zero, while the priority value for GO 106 may be maintained at the current level, 10.

These adjusted priority values may be used to resolve the conflict represented by the next pair of beacons, beacon 404 and beacon 412. Following the adjustments described above, the priority value for AP 104 is now zero and the priority value for GO 106 is 10. Therefore, client device 102 selects beacon 412 for reception and switches to Channel B as indicated by state line 418. The respective priority values may be adjusted again, following the principles described above. As such, since beacon 412 was selected, the priority value of GO 106 is reduced by 10 to zero. Further, since beacon 404 was not selected and the current priority value of AP 104 is zero, it may be reset to its initial value of 10. In turn, when the next pair of beacons, beacon 406 and beacon 414 arrive, client device may select beacon 406 for reception and switch to Channel A because the priority value for AP 104 is 10 and the priority value for GO 106 is zero. These priority values are again adjusted based upon this selection, so that the priority value for AP 104 is reduced to zero and the priority value for GO 106 is reset to the initial value of 10. As a result, client device may then select beacon 416 over beacon 408 and switch to Channel B as indicated. The pattern may repeat in a similar manner.

Figure 5:
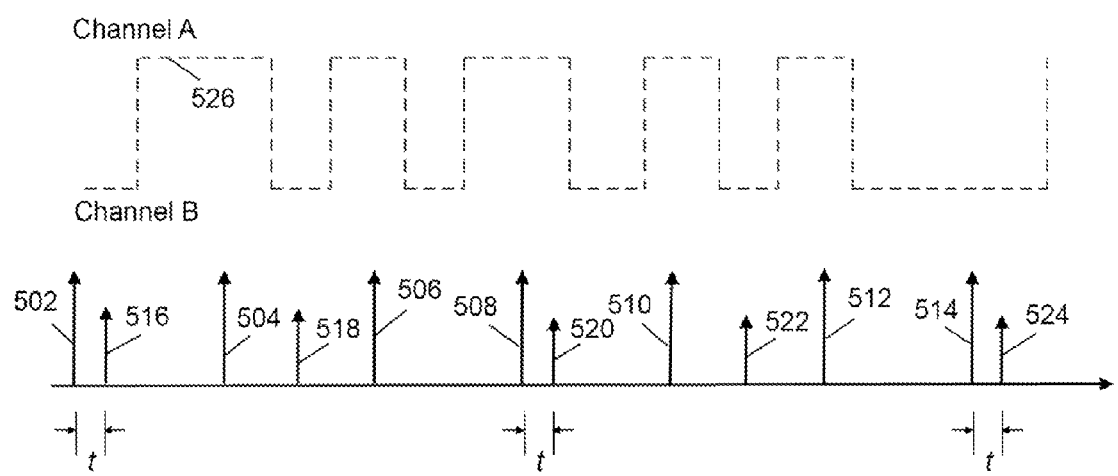
FIG. 5 schematically depicts another example of beacon transmission and reception, according to one embodiment of the invention.

Another specific example of priority assignment and adjustment is shown in FIG. 5, which schematically represents beacons sent by AP 104 and GO 106 and the corresponding operation of client device 102. Here, AP 104 periodically transmits a plurality of beacons 502, 504, 506, 508, 510, 512 and 514 while GO 106 similarly transmits beacons 516, 518, 520, 522 and 524. In this example, AP 104 operates on Channel A and GO 106 operates on Channel B as indicated by state line 526.

As described above, when the time duration t between the adjacent beacons is less than a suitable threshold value, client device 102 may be configured to identify a conflict and selectively receive a beacon from one of the networks on the basis of the corresponding priority values. In this example, the BI established by AP 104 is 100 TU while the BI established by GO 106 is 150 TU. As a result, conflicts do not occur with every beacon transmission, but intermittent conflicts may occur as indicated by the duration t with respect to the beacons pairs 502 and 516, 508 and 520, and 514 and 524. Again, if a static basis were employed to resolve the conflicts, beacons from one of the networks might be selected more frequently. For example, selecting beacons based upon arrival time would cause client device 102 to miss beacons 516, 520 and 524 in favor of beacons 502, 508 and 514, leading to a reception rate for GO 106 of 2/5 as opposed to a rate of 7/7 for AP 104. The priority assignment and adjustment techniques of this disclosure may be employed to achieve different reception rates as desired.

In particular, for the first conflict represented by beacons 502 and 516, the initial priority values may be based upon BI. By employing the same procedures as described with regard to FIG. 4, AP 104 may be assigned an initial priority value of 100/10 or 10 and GO 106 may be assigned an initial priority value of 150/10 or 15. As described above, GO 106 may be awarded a higher initial priority in view of its less frequent beacon transmission schedule. Accordingly, client device 102 may select beacon 516 for reception and switch to Channel B as necessary. Following a conflict resolution, the priority values for the networks associated with AP 104 and GO 106 may be adjusted. In this example, an adjustment factor of 5 may be employed, which corresponds to the greatest common denominator of the initial priority values, although other adjustment values may be employed as desired. Therefore, the priority value for AP 104 remains unchanged as beacon 502 was not selected while the priority value for GO 106 may be reduced by 5 to 10 because beacon 516 was selected.

For the next three beacons, beacons 504, 518 and 506, the durations between adjacent beacons is not less than the threshold, so client device may simply switch channels as necessary and receive the beacons in a conventional manner with no adjustment in priority values. The next conflict shown exists between beacons 508 and 520. By applying the adjusted priority values, it may be seen that the current priority values associated with AP 104 and GO 106 are both 10. When the priority values are equal, client device 102 may select between the beacons randomly. As shown, beacon 508 is selected and the subsequent adjustments may result in a reduction in the priority value of AP 104 from 10 to 5 and the priority value of GO 106 may remain the same at 10. Correspondingly, the next three beacons, beacons 510, 522 and 512 may be received conventionally since no conflict exists. For the last conflict depicted, between beacons 514 and 524, client device may be configured to receive beacon 524 since the priority value of GO 106 is 10 while the priority value of AP 104 is 5. The result of the described priority assignment and adjustment is a reception rate of 5/7 for AP 104 and a reception rate of 4/5 for GO 106, representing a more balanced performance as compared to a conflict resolution strategy employing a static basis as described above.

Further, it may be noted that if the random selection between beacons 508 and 520 resulted in the selection of beacon 520, the corresponding priority values for the next conflict between beacons 514 and 524 would have been 10 for AP 104 and 5 for GP 106, resulting in beacon 514 being selected. Therefore, the same relative reception rates may be achieved even though one of the conflicts was resolved on a random basis.

The above examples demonstrate that priority may be given initially to networks in which the beacon is sent more infrequently, as there are fewer opportunities to receive such beacons. However, the relative priorities are adjusted when beacons win or lose priority conflicts to increase the chance that a network losing a priority conflict will win a subsequent conflict, with the result that an acceptable number of beacons will be received overall from all networks in which client device 102 participates.

Using the techniques described above, the initial priority values and adjustment factors may be chosen to achieve a more balanced pattern of receiving beacons from multiple networks. However, the behavior of client device 102 may be configured as desired to give greater priority to one or more networks. For example, the factor used to set the initial priority in the above material may be based upon the beacon interval and the DTIM period, but any other suitable factor such as desired quality of service (QoS) or optimization of power savings may be employed. Although the above embodiments have been described in the context of two networks, additional networks may be accommodated in a similar manner.

Described herein are presently preferred embodiments. However, one skilled in the art that pertains to the present invention will understand that the principles of this disclosure can be extended easily with appropriate modifications to other applications.

What is claimed is:

1. A method for wireless communication comprising: communicably coupling a client device to a first network and a second network, wherein the first network and the second network are independent and wherein: the client device associates the first network with a first priority, and the client device associates the second network with a second priority lower than the first priority; selectively receiving by the client device a beacon from the first network as a result of the first priority being higher than the second priority when the client device is associated with both networks, wherein the first and second priorities are based at least in part on a factor selected from the group consisting of a beacon interval length, a delivery traffic indication map (DTIM) period and a prior priority determination; determining by the client device not to receive a beacon from the second network, wherein the beacon from the second network exists within a specified amount of time from time of existence of the beacon from the first network; and adjusting the first priority relative to the second priority in response to receiving the beacon from the first network.

2. The method of claim 1, further comprising determining the beacon from the first network and the beacon from the second network may conflict before selectively receiving the beacon.

3. The method of claim 2, wherein determining the beacon from the first network and the beacon from the second network may conflict comprises determining a duration between a target beacon transmission time for the first network and a target beacon transmission time for the second network is below a threshold.

4. The method of claim 1, wherein selectively receiving the beacon from the first network comprises switching wireless channels by the client device.

5. The method of claim 1, further comprising assigning the first priority to the first network and assigning the second priority to the second network, wherein the first priority and the second priority are based upon beacon interval length for the first network and beacon interval length for the second network.

6. The method of claim 5, wherein the first priority and the second priority are based at least in part upon delivery traffic indication map (DTIM) periods for the first network and DTIM periods for the second network.

7. The method of claim 1, wherein adjusting the first priority relative to the second priority comprises reducing the priority of the first network.

8. The method of claim 1, wherein adjusting the first priority relative to the second priority comprises increasing the priority of the second network.

9. The method of claim 1, further comprising selectively receiving a beacon from the second network, wherein the second priority is higher than the first priority after adjusting the first priority relative to the second priority.

10. A client device for wirelessly communicating with at least a first network and a second network, wherein the first network and the second network periodically transmit beacons and are independent, comprising: a priority module to assign a first priority to the first network and assign a second priority to the second network, wherein the first priority is higher than the second priority; and a wireless local area network (WLAN) module having circuitry for receiving wireless transmissions from the first network and the second network coupled to the priority module and to selectively receive a beacon from the first network as a result of the first priority being higher than the second priority when the client device is associated with both networks, wherein the first and second priorities are based at least in part on a factor selected from the group consisting of a beacon interval length, a delivery traffic indication map (DTIM) period and a prior priority determination, the WLAN module further to determine not to receive a beacon from the second network, wherein the beacon from the second network exists within a specified amount of time from time of existence of the beacon from the first network and the priority module further to adjust the first priority relative to the second priority in response to receiving the beacon from the first network.

11. The client device of claim 10, wherein the priority module further to determine the beacon from the first network may conflict with the beacon from the second network before the WLAN module selectively receives the beacon.

12. The client device of claim 11, wherein the priority module to determine the beacon from the first network may conflict by determining a duration between a target beacon transmission time for the first network and a target beacon transmission time for the second network is below a threshold.

13. The client device of claim 10, wherein the WLAN module selectively receives the beacon from the first network by switching wireless channels.

14. The client device of claim 10, wherein the priority module further to assign the first priority to the first network and to assign the second priority to the second network, wherein the first priority and the second priority are based upon beacon interval length for the first network and beacon interval length for the second network.

15. The client device of claim 10, wherein the first priority and the second priority are based at least in part upon delivery traffic indication map (DTIM) periods for the first network and DTIM periods for the second network.

16. The client device of claim 10, wherein the priority module adjusts the first priority relative to the second priority by reducing the priority of the first network.

17. The client device of claim 10, wherein the priority module adjusts the first priority relative to the second priority by increasing the priority of the second network.

18. The client device of claim 10, wherein the WLAN module further to selectively receive a beacon from the second network, wherein the second priority is higher than the first priority after adjusting the first priority relative to the second priority.

19. A non-transitory processor-readable storage medium for a client device for wirelessly communicating with at least a first network and a second network, wherein the first network and the second network periodically transmit beacons and are independent, comprising; the processor-readable storage medium having instructions thereon, the instructions comprising: code for assigning a first priority to the first network; code for assigning a second priority to the second network, wherein the second priority is lower than the first priority; code for causing the client device to selectively receive a beacon from the first network as a result of the first priority being higher than the second priority when the client device is associated with both networks, wherein the first and second priorities are based at least in part on a factor selected from the group consisting of a beacon interval length, a delivery traffic indication map (DTIM) period and a prior priority determination; code for causing the client device not to receive a beacon from the second network if the beacon from the second network exists within a specified amount of time from time of existence of the beacon from the first network; and code for adjusting the first priority relative to the second priority in response to receiving the beacon from the first network.

20. The storage medium of claim 19, further comprising code for determining the beacon from the first network and the beacon from the second network may conflict before selectively receiving the beacon.

21. The storage medium of claim 20, wherein the code for determining the beacon from the first network and the beacon from the second network may conflict comprises code for determining a duration between a target beacon transmission time for the first network and a target beacon transmission time for the second network is below a threshold.

22. The storage medium of claim 19, wherein the code for causing the client device to selectively receive the beacon from the first network comprises code for causing the client device to switch wireless channels.

23. The storage medium of claim 19, further comprising code for assigning the first priority to the first network and code for assigning the second priority to the second network, wherein the first priority and the second priority are based upon beacon interval length for the first network and beacon interval length for the second network.

24. The storage medium of claim 23, wherein the first priority and the second priority are based at least in part upon delivery traffic indication map (DTIM) periods for the first network and DTIM periods for the second network.

25. The storage medium of claim 19, wherein the code for adjusting the first priority relative to the second priority comprises code for reducing the priority of the first network.

26. The storage medium of claim 19, wherein the code for adjusting the first priority relative to the second priority comprises code for increasing the priority of the second network.

27. The storage medium of claim 19, further comprising code for causing the client device to selectively receive a beacon from the second network, wherein the second priority is higher than the first priority after adjusting the first priority relative to the second priority.

\* \* \* \* \*